(12) United States Patent
Dolan et al.

(10) Patent No.: US 10,171,292 B1
(45) Date of Patent: Jan. 1, 2019

(54) DEPLOYING A CLOUD INFRASTRUCTURE IN A REMOTE SITE

(71) Applicant: Amazon Technologies, Inc., Seattle, WA (US)

(72) Inventors: Niall Dolan, Dublin (IE); Gebran Krikor, Seattle, WA (US); Brendan Michael Connell, Brier, WA (US); Tobin Coziahr, Washington, DC (US); Peter Eseosa Ehiwe, Dublin (IE); Abhishek Patidar, Seattle, WA (US); Peter Gerard O'Connor, Seattle, WA (US); Ahmed Ezzat AbouRaya, Dublin (IE); Jerry Collier Lane, III, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 334 days.

(21) Appl. No.: 14/869,773

(22) Filed: Sep. 29, 2015

(51) Int. Cl.
*H04L 12/24* (2006.01)
*H04L 12/46* (2006.01)
*H04L 29/08* (2006.01)

(52) U.S. Cl.
CPC ...... *H04L 41/0803* (2013.01); *H04L 12/4641* (2013.01); *H04L 67/1002* (2013.01)

(58) Field of Classification Search
CPC ............. H04L 41/0803; H04L 67/1002; H04L 12/4641
USPC ........................................................ 709/217
See application file for complete search history.

(56) References Cited

U.S. PATENT DOCUMENTS

| | | | |
|---|---|---|---|
| 2013/0074064 A1* | 3/2013 | Das ........................... | G06F 8/61 718/1 |
| 2014/0280961 A1* | 9/2014 | Martinez ............. | H04L 41/5054 709/226 |
| 2015/0052262 A1* | 2/2015 | Chanda ............... | H04L 61/2015 709/245 |
| 2015/0074278 A1* | 3/2015 | Maes ...................... | H04L 47/70 709/226 |
| 2015/0163288 A1* | 6/2015 | Maes ...................... | H04L 67/10 709/203 |
| 2015/0199197 A1* | 7/2015 | Maes ........................ | G06F 8/71 717/122 |
| 2015/0207703 A1* | 7/2015 | Gallagher ........... | G06F 11/3006 709/224 |
| 2016/0164832 A1* | 6/2016 | Bellagamba ............ | H04L 67/10 726/12 |

* cited by examiner

*Primary Examiner* — Michael C Lai
(74) *Attorney, Agent, or Firm* — Klarquist Sparkman, LLP

(57) ABSTRACT

A method for deploying a cloud infrastructure includes obtaining a specification of one or more network resources in a new region of a service provider. A virtual private cloud (VPC) within an existing region of the service provider may be configured based on the specification, with a plurality of core configuration services. A connection is established between the VPC and the new region. The one or more network resources in the new region are established as a network infrastructure, and are configured over the established connection to run compute services, using at least one of the core configuration services. The plurality of core configuration services are transferred to the one or more network resources in the new region, and the new region is disconnected from the VPC.

10 Claims, 8 Drawing Sheets

DEPLOYING A CLOUD INFRASTRUCTURE IN A REMOTE SITE

BACKGROUND

Networks, such as public and/or private networks, can be large and complicated. For example, the network architecture of a large company may span many locations, such as data centers, cities, states, countries, and continents. Furthermore, the network architecture of a large company may be divided into a variety of different structures, each of which may provide different services external and/or internal to the company. One or more portions of such network architectures may be implemented in a cloud environment with cloud computing functionalities, where the cloud environment may include networks located in different geographic locations.

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs. Configuring network services to operate efficiently in a cloud computing environment can be a difficult task, especially in instances when network capacity grows and new cloud infrastructure has to be installed in remote locations.

DETAILED DESCRIPTION

Figure 1:
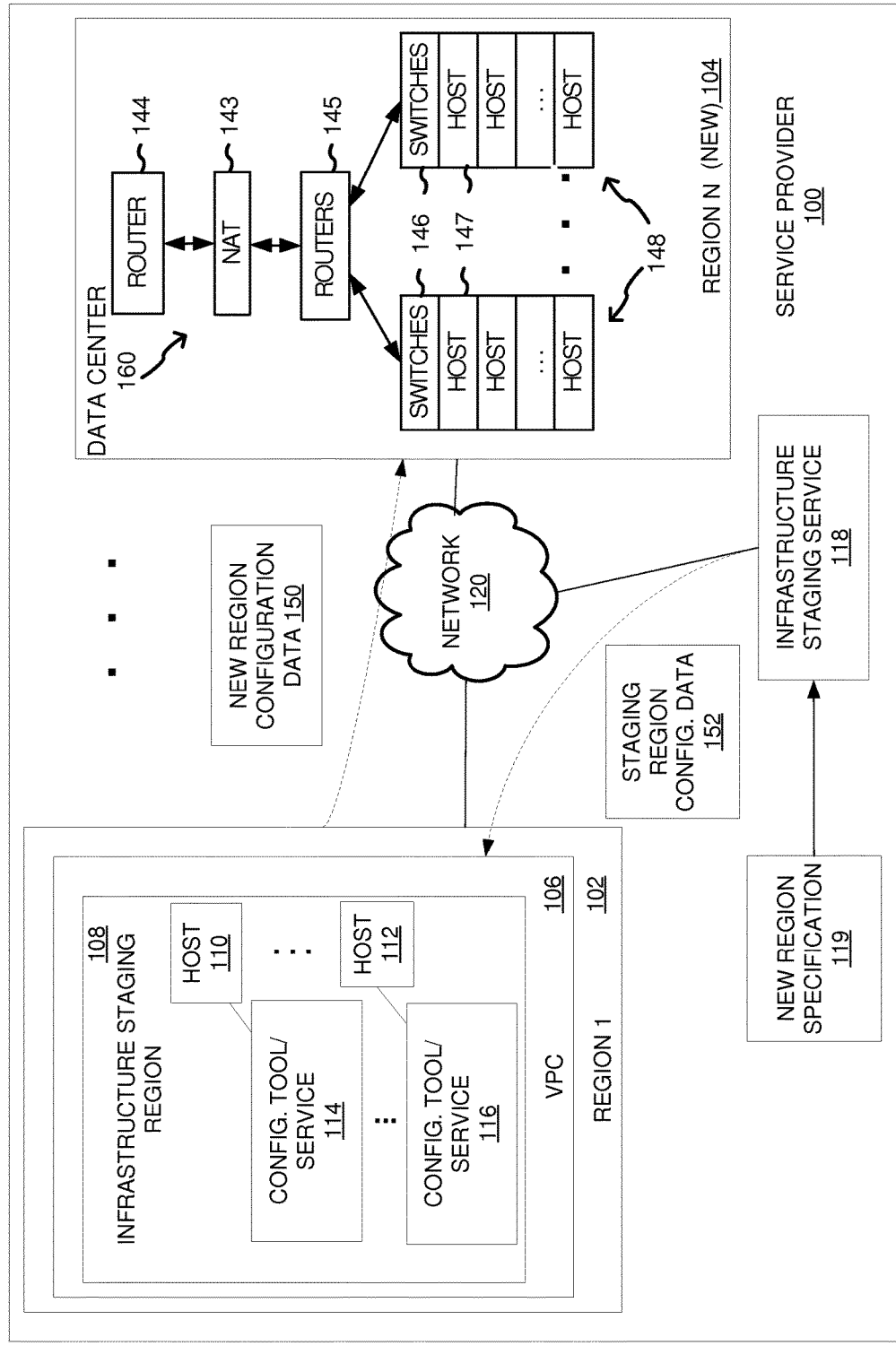
FIG. 1 is a network diagram illustrating deploying a cloud infrastructure in a service provider environment, in accordance with an example embodiment of the disclosure.

As described herein, various techniques and solutions can be applied for deploying a cloud infrastructure in a "green field" site or region (e.g., a location such as a new network region, without cloud infrastructure and connectivity). For example, an infrastructure staging region may be formed within an existing network region of a service provider. The infrastructure staging region may be deployed in a virtual private cloud (VPC), and the VPC may be configured with network configuration services (or build tools). The build tools can be used to build and configure network devices (e.g., switches, routers, racks) in the new region, provision host computers, and install the configuration services at the new region. During configuration, the VPC may be accessed by host computers in the new region, without a capability of the host computers to access any cloud infrastructure in the existing region (or any other region of the service provider) outside of the VPC.

As used herein, the term "service provider" can refer to a cloud provider capable of delivering computing and storage capacity, databases, as a service to one or more end recipients. The service provider can be established for an organization by, or on behalf of, the organization (that is, the service provider may offer a "private cloud environment"). In other instances, the service provider can support a multi-tenant environment, where a plurality of customers operate independently (i.e., a public cloud environment). In this regard, the plurality of customers (e.g., multiple enterprises) can pay to use resources, such as server computers, databases, storage, etc., within the multi-tenant environment.

As used herein, the term "enterprise-based network" (or "enterprise private network" or "enterprise network") can refer to the network of computer systems that are owned by an enterprise (e.g., a corporation or another business). Typically, information access within the enterprise-based network is limited to employees of the company. In that sense, the enterprise network is a single-tenant system. However, data can be available to external users through an enterprise portal, such as a web interface. Typically, server computers in the enterprise network are not rentable by third parties.

As used herein, the term "cluster" refers to a group of hosts (e.g., computing devices of various types, such as web servers, database servers, networking equipment, etc.) that are located in a particular geographical area. For example, a cluster may refer to a group of hosts located in a data center in a particular city (e.g., a group of hosts located in a data center at, or near, Los Angeles can be called the Los Angeles cluster). In some implementations, a network service is available from a number of clusters. For example, a business or organization may operate hosts in a number of different clusters (e.g., a San Francisco cluster, a Los Angeles cluster, a London cluster, etc.). Computing devices (e.g., servers) that are associated with a network service (e.g., an aggregator service as disclosed herein) can be located in one or more of the different clusters of the business or organization.

In some implementations, computing devices that provide a network service are organized in different ways. As used herein, the term "region" may refer to a geographic region, and computing devices can be organized by such geographical region (e.g., a city, state, country, continent, etc.). For example, computing devices associated with an aggregator service can be grouped into regions including a North America region, a Europe region, an Asia region, etc. In some implementations, combinations of grouping (e.g., cluster and region) can be used.

As used herein, the terms "region" or "network region" may also refer to an isolated region within a network environment (e.g., a virtual private cloud or private network within a network environment). For example, a client (e.g., a government agency) may move sensitive workloads into a private cloud (or network), thereby addressing regulatory and compliance requirements that may be associated with the client. In this regard, a private cloud (or an isolated region) may be used in instances when access to file data generated within the client's private network is restricted (e.g., sensitive/confidential data files and so forth). One or more remaining regions within the network environment (i.e., other than an isolated region) may be referred to as non-isolated regions. A network administrator may be provided unrestricted access to data files (e.g., log files, performance metrics files, and resource monitoring metrics files) within the non-isolated regions. However, access by the network administrator to such data files associated with the isolated region (e.g., data files created within the isolated region) may be restricted as the data files may contain sensitive data.

As used herein, the terms "private cloud", "virtual private cloud" and "private network" are interchangeable. As used herein, the terms "host", "host server" and "host server computer" are interchangeable.

As used herein, the term "cloud infrastructure" includes network infrastructure (e.g., one or more routers, switches and/or racks) as well as compute services running on such network infrastructure, where the network infrastructure may include in-region hosts (or host servers). Some examples of compute services are provided in reference to FIG. 4.

FIG. 1 is a network diagram illustrating deploying a cloud infrastructure in a service provider environment, in accordance with an example embodiment of the disclosure. Referring to FIG. 1, the service provider environment 100 (i.e., a cloud provider) may be capable of delivery of computing and storage capacity as a service to a community of end recipients. The service provider environment 100 includes a plurality of host server computers 110, . . . , 112, and 147 in regions 102, . . . , 104, and an infrastructure staging service 118, all communicatively coupled via the network 120.

A host server computer (e.g., 110) may comprise a CPU, memory, and storage (not illustrated in FIG. 1), and may be configured to execute a hypervisor or another type of program configured to enable the execution of multiple virtual machine instances (VMIs) or the execution of one or more configuration services (or tools), such as configuration services 114, . . . , 116. Host servers 110, . . . , 112 may be located within network region 102, and host servers 147 may be located within network region 104. Each of the regions 102, . . . , 104 may represent a different geographic area, such as a different city, state, country, continent, etc. For example, each region could represent a cluster (e.g., a group of hosts in a particular data center, such as data center 160 in region 104) or another type of geographical area (e.g., state or country). In an example embodiment, the regions 102, . . . , 104 may be isolated regions so that communication between the isolated regions takes place via a public network, such as the Internet. The network 120 may comprise the Internet as well as any combination of a wired and/or wireless network, and can be used for communication between the regions 102, . . . , 104 and/or the infrastructure staging service 118. In some implementations, other network connections may exist (e.g., direct or private network connections between regions and/or from regions to other networks).

The infrastructure staging service 118 may comprise suitable logic, circuitry, interfaces, and/or code and may be operable to perform functions associated with deploying cloud infrastructure in a new site or region. For example, the infrastructure staging service 118 may receive new region specification data 119, which may be associated with cloud infrastructure in a new region, such as region 104. For example, the specification data 119 may specify a number and type of network routers, switches, racks and hosts that will form a network infrastructure associated with the cloud infrastructure (e.g., data center 160) in the new region 104. The specification data 119 may optionally specify one or more compute services that will be running on in-region hosts. In an example embodiment, the new region 104 may include one or more data centers, such as data center 160, where the data centers may be coupled together via routers, such as routers 144. The data center 160 may further include a network address translator (NAT) 143, routers 145, switches 146 and host computers 147 connected in racks 148 to form the data center 160.

The router 144 reads address information in a received packet and determines the packet's destination. If the router decides that a different data center contains a host server computer for processing a given packet, then the packet is forwarded to that data center. If the packet is addressed to a host in the data center 160, then it is passed to a network address translator (NAT) 143 that converts the packet's public IP address to a private IP address. The NAT 143 also translates private addresses to public addresses that are bound outside of the data center 160. Additional routers 145 can be coupled to the NAT 143 to route packets to one or more racks 148 of host server computers 147. Each rack 148 can include a switch 146 coupled to multiple host server computers 147.

Each host 147 has underlying hardware, which may include a network interface card, one or more CPUs, memory, and so forth (not illustrated in FIG. 1). Running a layer above the hardware may be a hypervisor or kernel layer. The hypervisor or kernel layer can be classified as a type 1 or type 2 hypervisor. A type 1 hypervisor runs directly on the host hardware to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used.

A management layer can be part of the hypervisor or separated therefrom, and generally includes device drivers needed for accessing the hardware layer. Each host may also run one or more partitions, which are logical units of isolation by the hypervisor. Each partition can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

After the infrastructure staging service (ISS) 118 receives the new region specification data 119, the ISS 118 may generate staging region configuration data 152, which may specify the configuration services 114, . . . , 116 that can be used to configure the data center 160 in the new region 104. The ISS 118 can install (or launch) the configuration services 114, . . . , 116 on server computers 110, . . . , 112 in a separate infrastructure staging region (ISR) 108. In an example embodiment, the ISR 108 may be launched in a virtual private cloud (VPC) 106 within the existing region 102. The VPC 106 can be configured so that the configuration services 114, . . . , 116 can be installed in the ISR 108, and updates to the services 114, . . . , 116 can be pushed to the ISR 108 from the VPC 106 and/or from other hosts computers within the region 102 that are outside the VPC 106. The VPC 106 may connect to the new region 104 via the network 120 so that configuration data (such as configuration data 150 for configuring one or more components of the data centers in the new region 104), updates and other types of data can be communicated to the new region 104, without the capability for one or more of the hosts 147 (or other parts of a data center) to access one or more hosts or services located outside of the VPC 106 (e.g., hosts or services in region 102 that are outside of the VPC 106 or in a different region).

In an example embodiment, the set of configuration services 114, . . . , 116 may be installed independent of the new region specification data 119 (e.g., the services 114, . . . , 116 can be a standard set of configuration tools/services used for bootstrapping/launching a new region, such as region 104). The set of configuration services can include various types of logic, circuitry and/or code, with some examples illustrated in FIG. 3.

Figure 2:
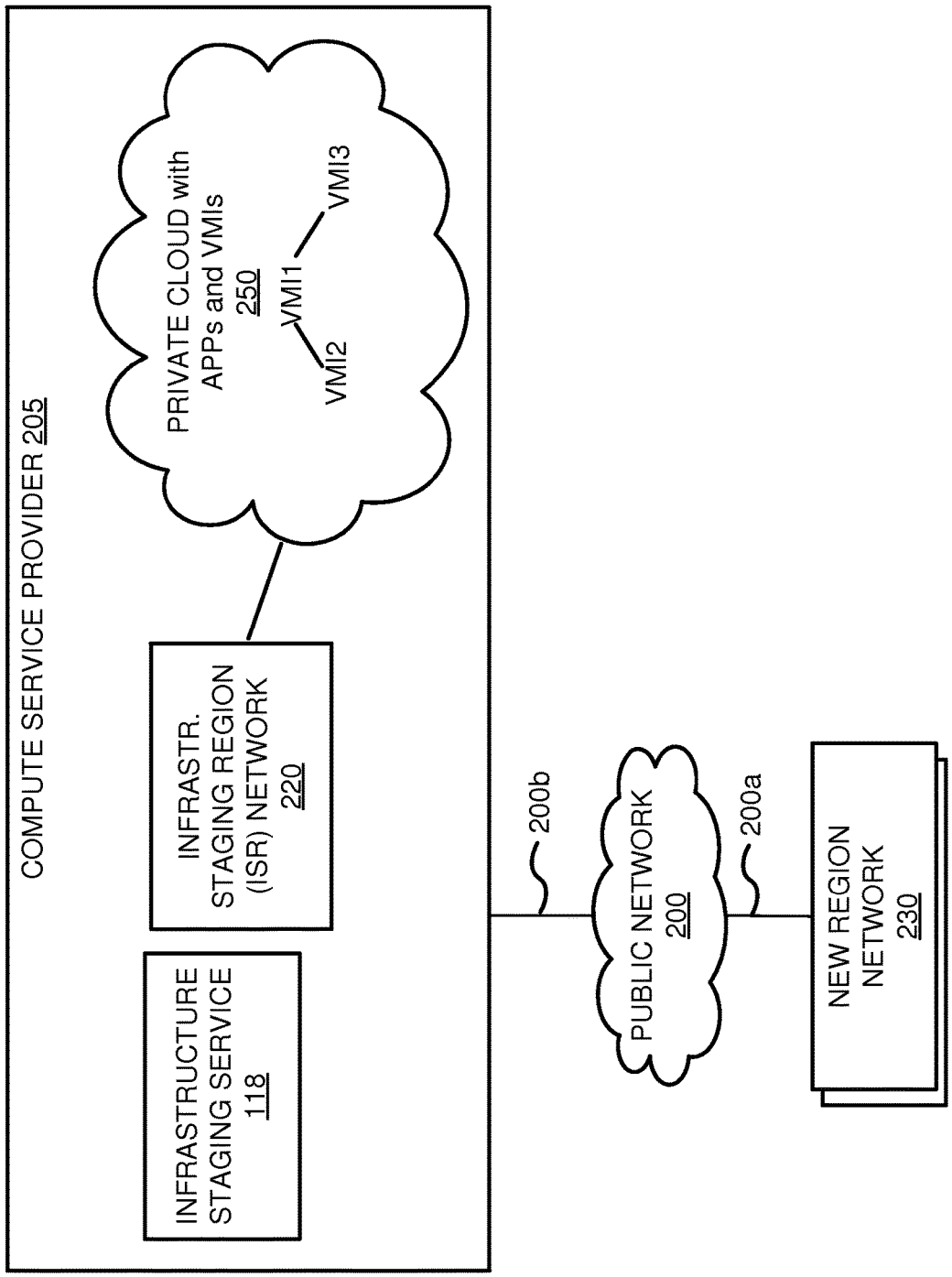
FIG. 2 is a network diagram illustrating example embodiments of interactions that involve establishing a new region network using an infrastructure staging region, in accordance with an example embodiment of the disclosure.

FIG. 2 is a network diagram illustrating example embodiments of interactions that involve establishing a new region network using an infrastructure staging region, in accordance with an example embodiment of the disclosure. More specifically, FIG. 2 is a network diagram illustrating an example embodiment of a compute service provider 205 that enables establishing a new region network 230 using an infrastructure staging region (ISR) network 220 within an existing region, where the ISR network 220 can be implemented in a private cloud environment 250 communicating with the new region network 230 over a public network 200.

In particular, in the example of FIG. 2, the ISS 118 may be used to create and configure the ISR network 220 with configuration tools, such as 114, . . . , 116. The ISR network 220 may be configured as part of a separate region (e.g., an isolated or non-isolated region). The ISR 220 may also be configured to enable secure private access from one or more other regions (e.g., new region network 230) over the public network 200 (e.g., via VPN connections established over interconnections 200a and 200b). In this example embodiment, the ISS 118 assists in providing functionality of the CSP 205 to the remote clients, such as in conjunction with various other modules (not shown) of the CSP 205 and various computing nodes and networking devices (not shown) that are used by the CSP 205 to provide the ISR network 220. In at least some embodiments, the ISS 118 may execute on one or more computing systems (not shown) of the CSP 205, and may provide one or more APIs that enable remote computing systems (e.g., hosts in the new region network 230) to programmatically interact with the ISR network 220 to access some or all functionality of the CSP 205. In addition, in at least some embodiments, the ISS 118 may be implemented within the ISR network 220 so that a network administrator of the new region network 230 may instead manually interact with the ISS 118 (e.g., via a user interface provided by the ISS 118) to perform some or all such actions connected to deploying cloud infrastructure in the new region network 230. The CSP 205 may also include an ISS 118 with functionalities as described in reference to FIG. 1. In some embodiments, one or more of the functionalities performed by the ISS 118 may be performed by another service (or services) within the CSP 205.

The public network 200 may be, for example, a publicly accessible network of linked networks, possibly operated by distinct parties, such as the Internet. The remote new region network 230 may include one or more existing private networks, such as a corporate or other private network (e.g., home, university, etc.) that is partially or wholly inaccessible to non-privileged users, and that includes computing systems and/or other networked devices of the CSP 205. In an example embodiment, the ISR network 220 may include one or more VMIs (e.g., VMI1-VMI3) running in a private cloud 250 within the compute service provider 205. The VMIs may be used to run one or more of the configuration services 114, . . . , 116 illustrated in FIG. 1.

In the illustrated example, the ISR network 220 may include multiple hosts (not shown), at least some of which are provided by or otherwise under the control of the CSP 205, and the ISR network 220 may be configured in various ways by the CSP 205. Access between the new region network 230 and the ISR network 220 may be enabled in various ways, such as by establishing a VPN connection or other secure connection between them that allows intercommunication over the public network 200 in a secure private manner. For example, the CSP 205 may automatically perform appropriate configuration on its computing nodes and other computing systems to enable VPN access to the ISR network 220, including the private cloud 250, such as by automatically configuring one or more VPN mechanisms hosted by the CSP 205 (e.g., software and/or hardware VPN mechanisms), and/or may automatically provide appropriate configuration information to the client (e.g., credentials, access points, and/or other parameters) to allow a VPN mechanism hosted on the new region network 230 to establish the VPN access. After VPN access has been appropriately enabled and/or configured, a VPN connection may be established between the ISR network 220 and the new region network 230, such as initiated by using IPsec ("Internet Protocol Security") or other appropriate communication technologies. For example, in some embodiments, a VPN connection or other secure connection may be established to or between networks that use MPLS ("Multi Protocol Label Switching") for data transmission, such as instead of an IPsec-based VPN connection.

In other embodiments, the CSP 205 may automatically select network addresses to be used for at least some computing nodes of the ISR network 220, such as based on network addresses that are available for use by the CSP 205, based on selecting network addresses that are related network addresses used by remote existing computer networks corresponding to the provided computer networks, etc.

Figure 3:
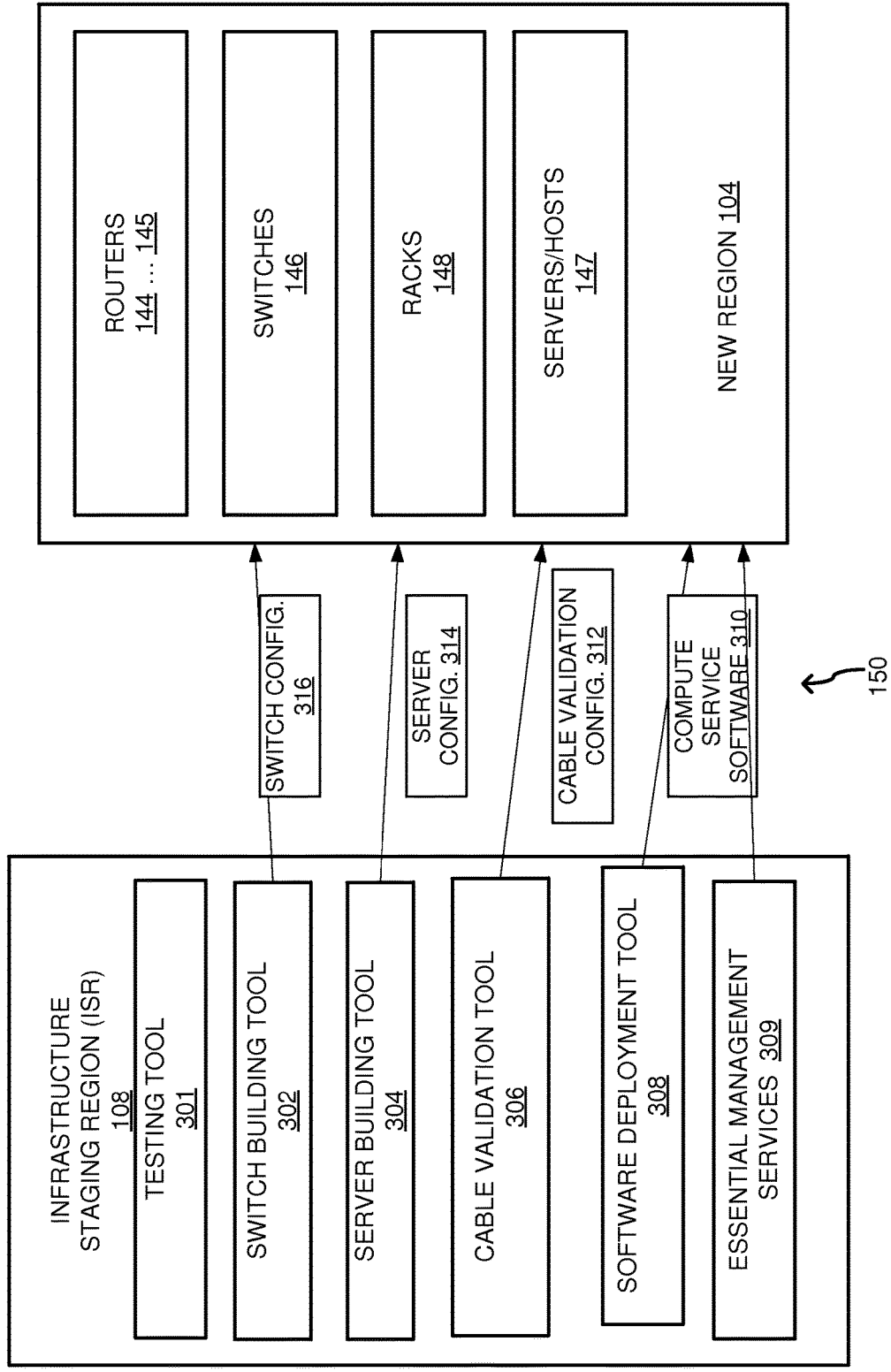
FIG. 3 is a network diagram illustrating configuring a new region using configuration services/tools in an infrastructure staging region, in accordance with an example embodiment of the disclosure.

FIG. 3 is a network diagram illustrating configuring a new region using configuration services/tools in an infrastructure staging region, in accordance with an example embodiment of the disclosure. Referring to FIG. 3, the ISR 108 may be configured with one or more core configuration tools (or services) 114, . . . , 116 for deploying and configuring cloud infrastructure (including network infrastructure and compute services) in the new region 104. For example, the core configuration tools may include a testing tool 301, a switch building tool 302, a server building tool 304, a cable validation tool 306, a software deployment tool 308, essential management services 309, and/or one or more other tools.

The tools 302-306 may be used to build the network infrastructure of the new region 104, which may include routers 144, . . . , 145, switches 146 and racks 148. The software deployment tool 308 and the essential management services 309 may be used to configure the network infrastructure in the new region with compute services (e.g., by installing the compute services software 310). The essential management services associated with the compute services may include an account management service, a software repository service for accessing/managing a software repository, network time protocol (NTP) management service, a directory service providing information on hosts and services, a credential management service for controlling access to network devices and available command functions users can run, and so forth.

Figure 4:
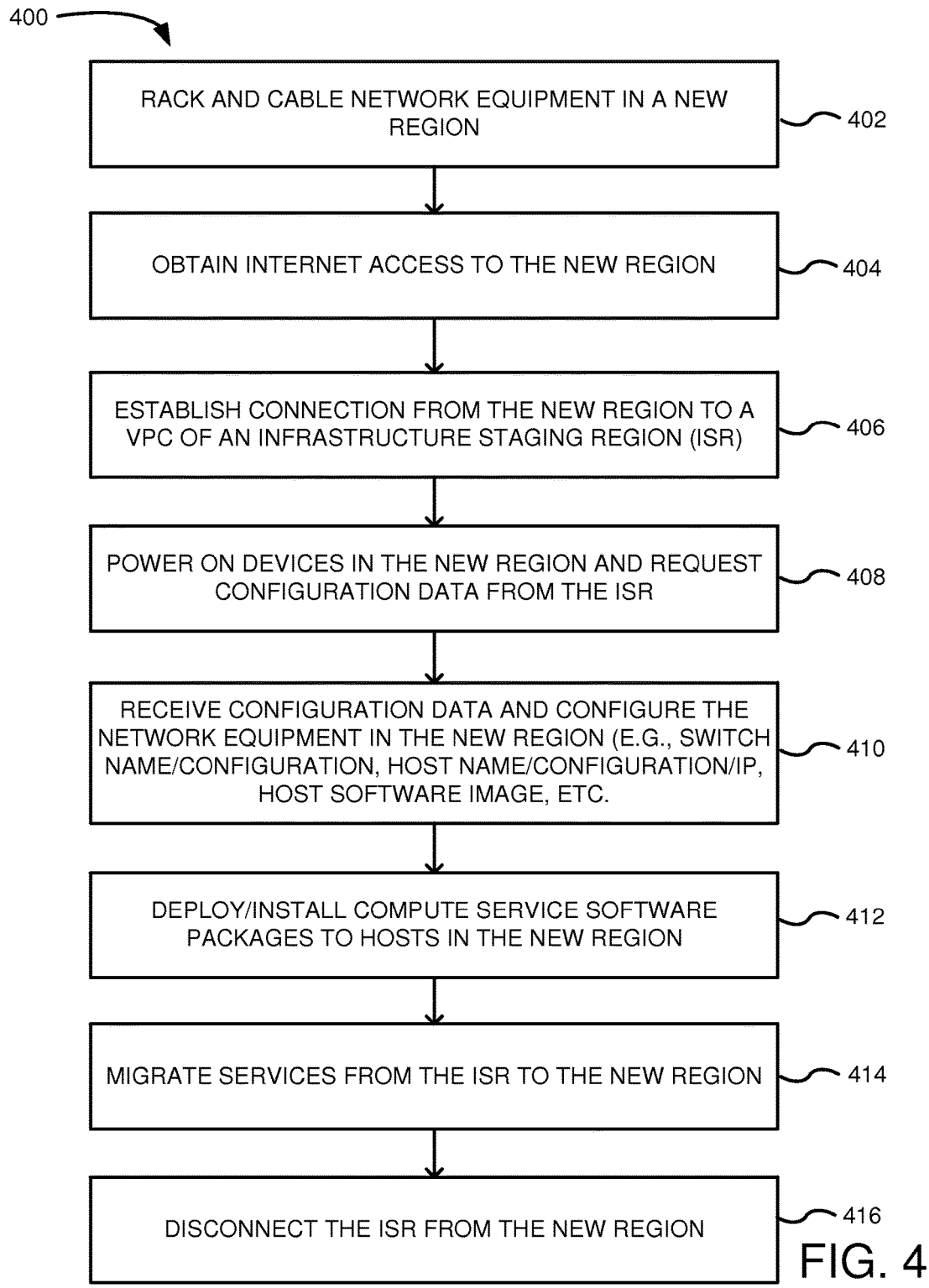
FIGS. 4-7 are flowcharts of example methods of deploying a cloud infrastructure, in accordance with one or more embodiments of the disclosure.

An example flowchart of a configuration sequence 400 using the configuration services in the ISR 108 is illustrated in FIG. 4. For example, at 402, network equipment can be racked and cabled in a new region, such as region 104. More specifically, routers 144-145, switches 146 and hosts 147 can be connected in racks 148, forming one or more data centers 160. At 404, Internet access to the new region 104 can be obtained. At 406, a connection can be established from the new region 104 to a VPC of an Infrastructure Staging Region (ISR). For example, the ISS 118 may deploy (or install) configuration services 114, . . . , 116 (including 302, . . . , 308) in the ISR 108, and the ISR 108 may be configured inside a VPC 106. The connection between the new region 104 and the ISR 108 in the VPC 106 can be established via the network 120 (which can include a public network such as the Internet).

At 408, devices in the new region 104 are powered ON, and the devices (e.g., 144, . . . , 148) can request configuration data from the ISR 108. At 410, new region configuration data (e.g., 150) is received. For example, the cable validation tool 306 can provide validation data 312 to validate the cable connections in the data center 160. The switch building tool 302 may generate switch configuration data 316 for establishing switch names, IP addresses and other configuration of switches 146. The server building tool 304 may generate server configuration data 314 for establishing server names, IP addresses, initial host software image and other configuration of servers/hosts 147. After the servers are configured, at 412, the software deployment tool 308 may deploy and install one or more compute service software packages 310 at the hosts 147, which can include software used for configuring components of the data center 160 or essential management services 309. At 414, one or more services (e.g., 114, . . . , 116) can be migrated from the ISR 108 to the new region 104. The use of NAT can allow for the migration of services from the ISR 108 to the new region 104 without assigning new addresses to the migrated services. At 416, the ISR 108 is disconnected from the new region 104.

Figure 5:
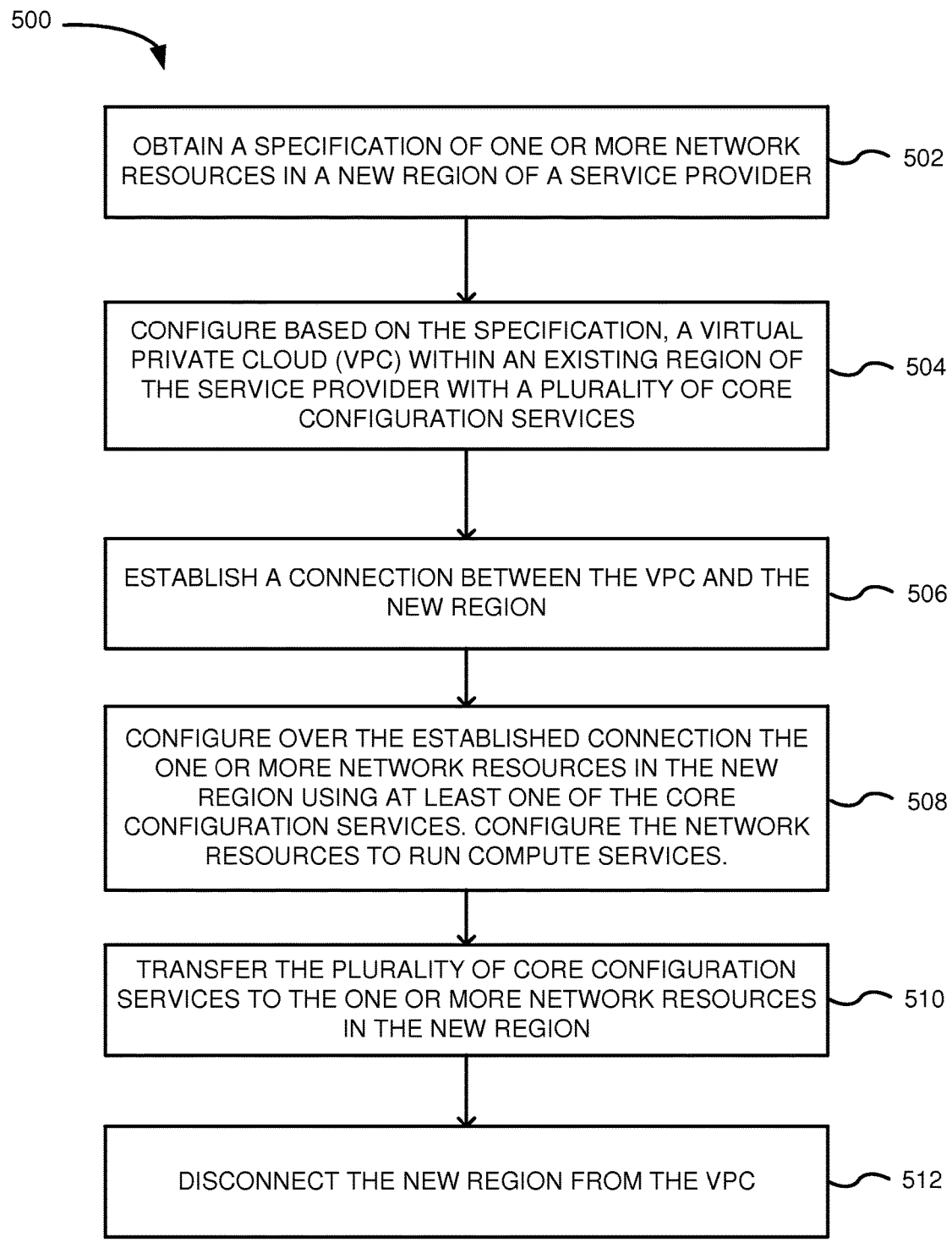
Figure 6:
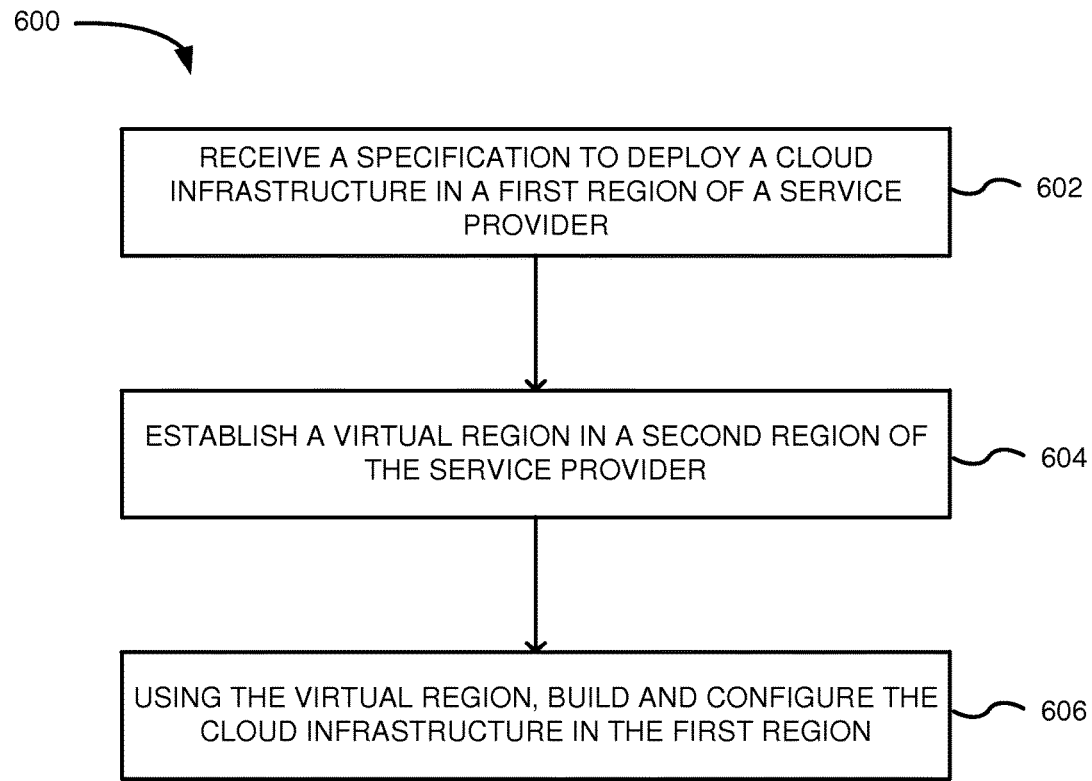
Figure 7:
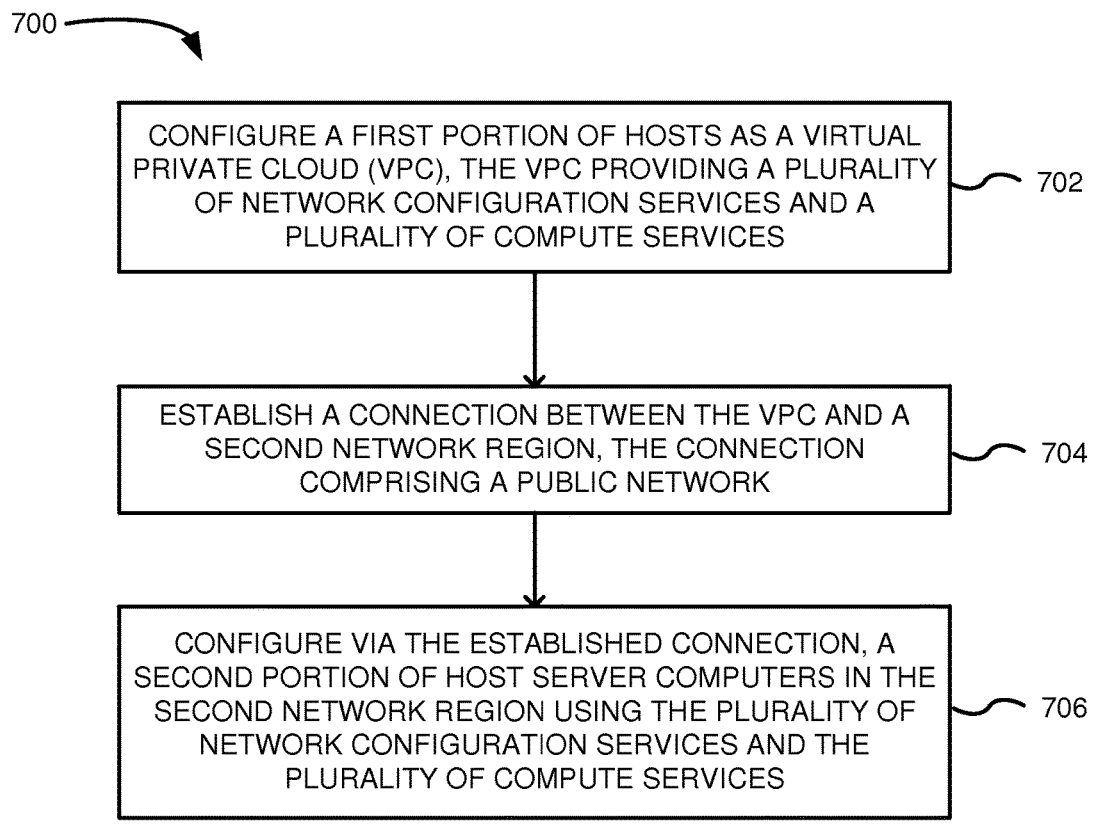

FIGS. 5-7 are flowcharts of example methods of deploying a cloud infrastructure, in accordance with one or more embodiments of the disclosure. Referring to FIGS. 1, 3, and 5, the example method 500 may start at 502, when a specification of one or more network resources in a new region of a service provider may be obtained. For example, the ISS 118 may obtain specification 119 for the infrastructure (e.g., data center 160) that is to be deployed in a new region 104. At 504, a virtual private cloud (VPC) within an existing region of the service provider may be configured, based on the specification, with a plurality of core configuration services. For example, the ISS 118 may configure the ISR 108 in the VPC 106 with the configuration services 114, . . . , 116. At 506, a connection can be established between the VPC and the new region. For example, a connection is established between the new region 104 and the ISR 108 via the network 120. At 508, the ISS 118 can configure over the established connection the one or more network resources in the new region using at least one of the core configuration services. Additionally, the plurality of core configuration services (e.g., the essential management services 309) can be used to configure the one or more network resources in the new region to run at least one compute service (e.g., compute service software 310 can be installed so that the network infrastructure in the new region can run compute services). For example and as seen in FIG. 3, the configuration services 302, . . . , 308 can communicate configuration data 301, . . . , 316 to build and configure the network resources 144, . . . , 148 in the new region 104. At 510, the plurality of core configuration services are transferred to the one or more network resources in the new region. For example, one or more of the configuration services 114, . . . , 116 (including services/tools 302, . . . , 308) can be transferred (or installed) at the hosts 147 in the new region 104. At 512, the new region 104 can be disconnected from the VPC 106.

Referring to FIGS. 1, 3, and 6, the example method 600 may start at 602, when a specification to deploy a cloud infrastructure in a first region of a service provider is received. For example, the ISS 118 receives the new region specification 119 for deploying cloud infrastructure in the new region 104. At 604, a virtual region is established in a second region of the service provider. For example, a virtual private cloud (VPC) 106 is established in the existing region 102. At 606, using the virtual region, the cloud infrastructure in the new region 104 can be built and configured. For example, ISS 118 can install (or launch) the configuration services 114, . . . , 116 on server computers 110, . . . , 112 in the separate infrastructure staging region (ISR) 108. The ISR 108 is launched in a virtual private cloud (VPC) 106 within the existing region 102. The VPC 106 can be configured so that the configuration services 114, . . . , 116 can be installed in the ISR 108, and updates to the services 114, . . . , 116 can be pushed to the ISR 108 from the VPC 106 and/or from other hosts computers within the region 102 that are outside the VPC 106. The VPC 106 may connect to the new region 104 via the network 120 so that configuration data (such as configuration data 150 for configuring one or more components of the data centers in the new region 104), updates and other types of data can be communicated to the new region 104, without the capability for one or more of the hosts 147 (or other parts of a data center) to access one or more hosts or services located outside of the VPC 106. The configuration data 150 is used to build and configure the cloud infrastructure in the new region 104, which may include building a network infrastructure and then configuring the network infrastructure to run one or more compute services.

Referring to FIGS. 1, 3, and 7, the example method 700 may start at 702, when the ISS 116 may configure at least a portion of the first network region (e.g., region 102) as a virtual private cloud (e.g., VPC 106). The VPC includes a plurality of network configuration services, such as 114, . . . , 116 and 301, . . . , 308) as well as a plurality of compute services (e.g., 308, 309). At 704, a connection is established between the VPC (106) and the second network region (104), the connection including a public network (e.g., network 120 can include the Internet). At 706, the ISS 118 can configure via the established connection, host server computers (e.g., 147) in the second network region (104) as a network infrastructure using the plurality of network configuration services (e.g., 114, . . . , 116 and 301, . . . , 308). The network infrastructure may then be configured to run compute services by installing the compute services software (310), associated with the software deployment tool 308 and the essential management services 309. One or more of the installed compute services may be verified/tested using the testing tool 301.

Figure 8:
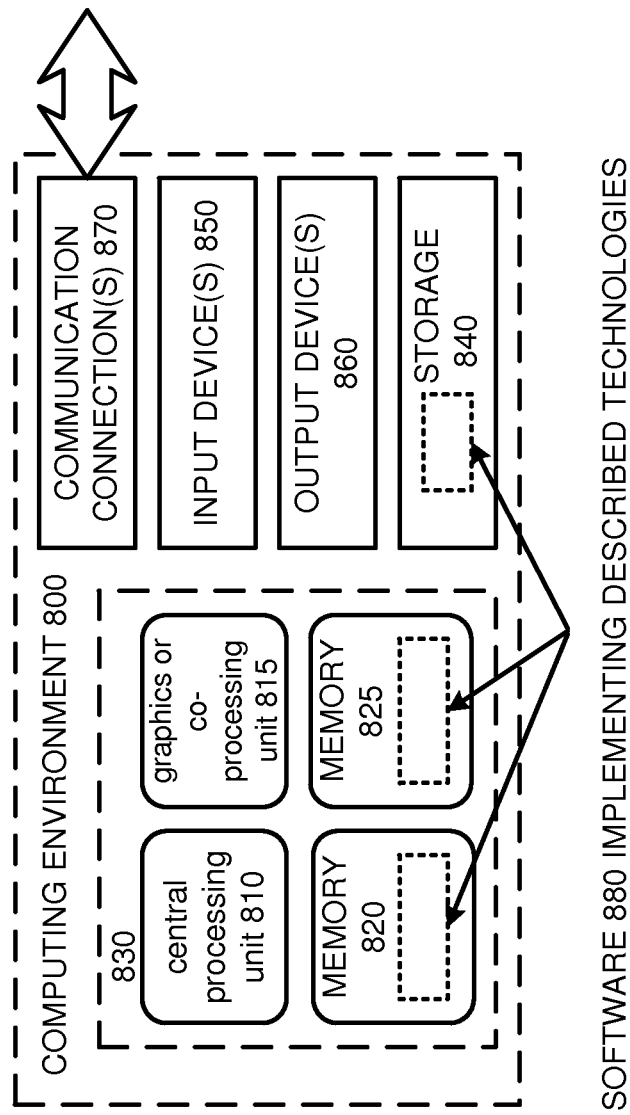
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method for deploying a cloud infrastructure, the method comprising:
   obtaining a specification of one or more network resources in a new region of a service provider, wherein the specification comprises at least one of the following: a number of servers to operate within the new region or information identifying one or more services to be performed by the one or more network resources in the new region;
   configuring, based on the specification, a virtual private cloud (VPC) within an existing region of the service provider with a plurality of core configuration services;
   establishing a network connection between the VPC and the new region;
   configuring, over the established connection, the one or more network resources in the new region as a network infrastructure, wherein the network infrastructure includes a number and type of network switches, using at least one of the plurality of core configuration services;
   using the plurality of core configuration services, configuring the one or more network resources, including the network switches, in the network infrastructure to run at least one compute service;
   transferring the plurality of core configuration services to the one or more network resources in the new region; and
   disconnecting the new region from the VPC.

2. The method according to claim 1, wherein the existing region and the new region are at different geographic locations.

3. The method according to claim 1, wherein the existing region is isolated from the new region and the connection between the VPC and the new region comprises the Internet.

4. The method according to claim 1, wherein the existing region comprises one or more server computers that are outside of the VPC, and access to the one or more server computers is controlled by the VPC.

5. The method according to claim 1, further comprising:
   receiving at the VPC, a configuration request from the one or more network resources in the new region; and
   performing the configuring of the one or more network resources in the new region in response to the configuration request.

6. A system for deploying a cloud infrastructure in a remote site, the system comprising:
   a plurality of host server computers coupled together through a network to form a service provider, wherein:
   a first portion of the host server computers are located in a first network region of the service provider; and
   a second portion of the host server computers are located in a second network region of the service provider; and
   an infrastructure staging service communicatively coupled to the plurality of host server computers, the infrastructure staging service for performing the following:
   receiving a specification of the host server computers in the second network region, wherein the specification comprises at least one of the following: a number of servers to operate within the second network region or information identifying one or more services to be performed in the second network region;
   configuring the first portion of the host server computers as a virtual private cloud (VPC), the VPC providing a plurality of network configuration services and a plurality of compute services;
   establishing a connection between the VPC and the second network region, the connection comprising a public network; and
   configuring, via the established connection, the second portion of the host server computers in the second network region using the plurality of network configuration services and the plurality of compute services.

7. The system according to claim 6, wherein the configuring of the plurality of network configuration services and the plurality of compute services in the VPC is based on the specification.

8. The system according to claim 6, wherein the infrastructure staging service is for performing the following:
   receiving a configuration request from one of the host server computers in the second region; and
   configuring the second portion of the host server computers based on the configuration request and using the plurality of network configuration services.

9. The system according to claim 8, wherein the infrastructure staging service is for performing the following:
   migrating the plurality of network configuration services from the VPC to the second network region; and
   configuring the second portion of the host server computers further based on the plurality of compute services.

10. The system according to claim 9, wherein the infrastructure staging service is for performing the following:
    testing one or more of the plurality of compute services running on the second portion of the host server computers; and
    upon successful testing, disconnecting the VPC from the second network region upon completion of migration of the plurality of network configuration services.

* * * * *